US012185154B2

(12) United States Patent
Kim et al.

(10) Patent No.: US 12,185,154 B2
(45) Date of Patent: Dec. 31, 2024

(54) MULTIPLEX TRANSMISSION METHOD AND APPARATUS IN MULTI-LINK WIRELESS LAN

(71) Applicants: Hyundai Motor Company, Seoul (KR); Kia Corporation, Seoul (KR); Korea National University of Transportation Industry-Academic Cooperation Foundation, Chungju-Si (KR)

(72) Inventors: Yong Ho Kim, Incheon (KR); Han Seul Hong, Seoul (KR)

(73) Assignees: Hyundai Motor Company, Seoul (KR); Kia Corporation, Seoul (KR); Korea National University of Transportation Industry-Academic Cooperation Foundation, Seoul (KR)

( * ) Notice: Subject to any disclaimer, the term of this patent is extended or adjusted under 35 U.S.C. 154(b) by 445 days.

(21) Appl. No.: 17/625,025

(22) PCT Filed: Jul. 2, 2020

(86) PCT No.: PCT/KR2020/008677
§ 371 (c)(1),
(2) Date: Jan. 5, 2022

(87) PCT Pub. No.: WO2021/006545
PCT Pub. Date: Jan. 14, 2021

(65) Prior Publication Data
US 2022/0279375 A1    Sep. 1, 2022

(30) Foreign Application Priority Data
Jul. 5, 2019 (KR) .................. 10-2019-0081263

(51) Int. Cl.
*H04W 28/02* (2009.01)
*H04W 76/15* (2018.01)
*H04W 84/12* (2009.01)

(52) U.S. Cl.
CPC ....... *H04W 28/0263* (2013.01); *H04W 76/15* (2018.02); *H04W 84/12* (2013.01)

(58) Field of Classification Search
CPC .. H04W 28/0263; H04W 76/15; H04W 84/12
See application file for complete search history.

(56) References Cited

U.S. PATENT DOCUMENTS

2013/0336250 A1    12/2013    Park et al.
2017/0332385 A1    11/2017    Shirali et al.
(Continued)

FOREIGN PATENT DOCUMENTS

KR    10-2013-0139660 A    12/2013
WO    2010-134737 A2    11/2010

OTHER PUBLICATIONS

A. Patil et al., "Multi-Link Operation: Design Discussion", Qualcomm Inc., IEEE 802.11-19/0923r0, May 14, 2019.
(Continued)

*Primary Examiner* — Ajay Cattungal
(74) *Attorney, Agent, or Firm* — Fox Rothschild LLP

(57) ABSTRACT

A multiplex transmission method and apparatus in a multi-link wireless LAN are disclosed. An operating method of a first device comprises the steps of: setting a first link linked with a second device and a first service; setting a second link linked with the second device and a second service; and performing communication with the second device by using the first link and/or the second link. Therefore, the performance of a communication system can be improved.

19 Claims, 10 Drawing Sheets

(56) References Cited

U.S. PATENT DOCUMENTS

| | | | |
|---|---|---|---|
| 2018/0206174 A1* | 7/2018 | Zhou | H04B 1/0483 |
| 2019/0082373 A1* | 3/2019 | Patil | H04L 1/1614 |
| 2019/0150214 A1* | 5/2019 | Zhou | H04W 76/15 370/329 |
| 2019/0268956 A1* | 8/2019 | Xiao | H04W 76/15 |
| 2020/0288523 A1* | 9/2020 | Patil | H04W 80/02 |
| 2020/0359259 A1* | 11/2020 | Patil | H04W 88/08 |
| 2021/0076419 A1* | 3/2021 | Naribole | H04W 56/001 |
| 2021/0114616 A1* | 4/2021 | Altman | H04W 76/15 |
| 2021/0329698 A1* | 10/2021 | Jang | H04W 80/02 |

OTHER PUBLICATIONS

Y. Seok, "EHT Multi-Link Operation", MediaTek Inc., IEEE 80211-19/07 31r0, May 16, 2019.
International Search Report issued Sep. 24, 2020 in corresponding PCT Application No. PCT/KR2020/008677.

\* cited by examiner

MULTIPLEX TRANSMISSION METHOD AND APPARATUS IN MULTI-LINK WIRELESS LAN

CROSS-REFERENCE TO RELATED APPLICATIONS

This application is a National Phase application filed under 35 USC 371 of PCT International Application No. PCT/KR2020/008677 with an International Filing Date of Jul. 2, 2020, which claims priority from Korean Application 10-2019-0081263 filed on Jul. 5, 2019. The entire contents of these applications are incorporated herein by reference in their entirety.

BACKGROUND

(a) Technical Field

The present disclosure relates to a wireless LAN communication method, and more particularly, to a multi-user wideband communication method, apparatus, and system for wideband data transmission in a wideband wireless LAN multi-link structure.

(b) Description of the Related Art

Recently, with the spread of mobile devices, wireless LAN technology that can provide fast wireless Internet services to the mobile devices has been in the spotlight. The standards for the wireless LAN technology are being developed mainly as the IEEE 802.11 standards by the Institute of Electrical and Electronics Engineers (IEEE). The IEEE 802.11 standards were developed and standardized in such a way that, starting with the initial version supporting 1 to 2 Mbps, they were revised through subsequent versions.

Standardized technologies for specific operations such as fast handoff (i.e., fast BSS transition), fast initial link setup, technology for low-power terminals operating in a band of 1 GHz or below, wireless LAN technology for vehicle terminals, and the like were developed, and reflected in the respective standard revisions. In particular, the wireless LAN technology for vehicle terminals is reflected in the IEEE 802.11p, which is based on a signal form in the IEEE 802.11a and an enhanced distributed channel access (EDCA) in the IEEE 802.11e, and operates in a band of 5.9 GHz. Further, it is based on a 10 MHz bandwidth to be suitable for a terminal having high mobility, and supports 'outside context of BSS (OCB)' communication so that the terminal can directly perform inter-vehicle communications without going through authentication and association procedures with a wireless access point.

Meanwhile, as more sensors and operations are developed for vehicle communication operations, applications for the corresponding operations are diversified, and in order to achieve a higher data throughput and improve a transmission distance compared to the IEEE 802.11p, the IEEE 802.11bd is being developed and standardized to establish a wireless LAN standard for next-generation vehicle (i.e., next generation V2X (NGV)) communication.

Recently, as applications requiring a higher throughput and applications requiring real-time transmissions occur, an Extreme High Throughput (EHT) wireless LAN technology has been proposed and is under development.

SUMMARY

The present disclosure is directed to increasing channel efficiency through a multi-user transmission scheme using a multi-link signal, and is directed to providing a method, an apparatus, and a system for a multi-user packet transmission operation using a wireless LAN.

An operation method of a first device, according to a first exemplary embodiment of the present disclosure for achieving the objective, may comprise: configuring a first link with a second device, the first link being associated with a first service; configuring a second link with the second device, the second link being associated with a second service; and performing communication with the second device using one or more of the first link and the second link, wherein the first link is a link configured between a node #11 included in the first device and a node #21 included in the second device, and the second link is a link configured between a node #12 included in the first device and a node #22 included in the second device.

A traffic type of data transmitted/received according to the first service may be indicated by a first traffic identifier (TID), and a traffic type of data transmitted/received according to the second service may be indicated by a second TID.

The first TID may be mapped to one or more links including the first link, and the second TID may be mapped to one or more links including the second link.

When the first link to which the first TID is mapped is used for transmission of a frame including the data, the first link may be determined as enabled.

A transmission priority of the first TID may be set differently from a transmission priority of the second TID.

The performing communication with the second device may comprise:
transmitting a first frame to the second device on the first link; and transmitting a second frame to the second device on the second link.

A transmission starting time of the second frame may be same as a transmission starting time of the first frame, and a transmission completion time of the second frame may be same as a transmission completion time of the first frame.

A media access control (MAC) header of the first frame may include first destination address information, and a MAC header of the second frame may include second destination address information indicating an address different from the first destination address information.

An operation method of a first device, according to a second exemplary embodiment of the present disclosure for achieving the objective, may comprise: configuring a first link with a second device, the first link being associated with a first service; configuring a second link with the second device, the second link being associated with a second service; receiving one or more frames using one or more of the first link and the second link; and transmitting response frame(s) for the received one or more frames by using one or more of the first link and the second link, wherein the first link is a link configured between a node #11 included in the first device and a node #21 included in the second device, and the second link is a link configured between a node #12 included in the first device and a node #22 included in the second device.

A traffic type of data transmitted/received according to the first service may be indicated by a first traffic identifier (TID), a traffic type of data transmitted/received according to the second service may be indicated by a second TID, the first TID may be mapped to one or more links including the first link, and the second TID may be mapped to one or more links including the second link.

The transmitting of the response frame(s) may comprise: transmitting, to the second device, a first response frame that is a response frame to a first frame received on the first link;

and transmitting, to the second device, a second response frame that is a response frame to a second frame received on the second link.

The first response frame may be transmitted on a link indicated by the first frame, and the second response frame may be transmitted on a link indicated by the second frame.

A transmission starting time of the second frame may be same as a transmission starting time of the first frame, and a transmission completion time of the second frame may be same as a transmission completion time of the first frame.

A first device, according to a third exemplary embodiment of the present disclosure for achieving the objective, may comprise: a processor; a memory electronically communicating with the processor; and one or more instructions stored in the memory, wherein when executed by the processor, the one or more instructions cause the first device to: configure a first link with a second device, the first link being associated with a first service; configure a second link with the second device, the second link being associated with a second service; and transmit one or more physical layer protocol data unit(s) (PPDU(s)) to the second device by using one or more of the first link and the second link, wherein the first link is a link configured between a node #11 included in the first device and a node #21 included in the second device, and the second link is a link configured between a node #12 included in the first device and a node #22 included in the second device.

A traffic type of data transmitted/received according to the first service may be indicated by a first traffic identifier (TID), a traffic type of data transmitted/received according to the second service may be indicated by a second TID, the first TID may be mapped to one or more links including the first link, and the second TID may be mapped to one or more links including the second link.

In the performing communication with the second device, the one or more instructions may cause the first device to: transmit a first frame to the second device on the first link; and transmit a second frame to the second device on the second link.

A transmission starting time of the second frame may be same as a transmission starting time of the first frame, and a transmission completion time of the second frame may be same as a transmission completion time of the first frame.

The one or more instructions may cause the first device to: transmit, to the second device, a first response frame that is a response frame to the first frame received on the first link; and transmit, to the second device, a second response frame that is a response frame to the second frame received on the second link.

The first response frame may be transmitted on a link indicated by the first frame, and the second response frame may be transmitted on a link indicated by the second frame.

A reception starting time of the second response frame may be same as a reception starting time of the first response frame, and a reception completion time of the second response frame may be same as a reception completion time of the first response frame.

According to the present disclosure, when a wireless LAN terminal node (i.e., station) desires to transmit frames including individual addresses or a group address to a plurality of communication nodes, the frames may be transmitted on a multi-link using a plurality of links, whereby the frames can be transmitted at a time to the plurality of communication nodes (i.e., AP(s) or STA(s)) managed within one multi-link device (MLD). Using the multi-user transmission method, an effect of using frequency resources more efficiently can be achieved.

The present disclosure may be used in various communication devices such as a terminal (i.e., station), a wireless access point, and an access management device using a wireless LAN, and a station and a base station using a cellular communication.

DETAILED DESCRIPTION

Figure 1:
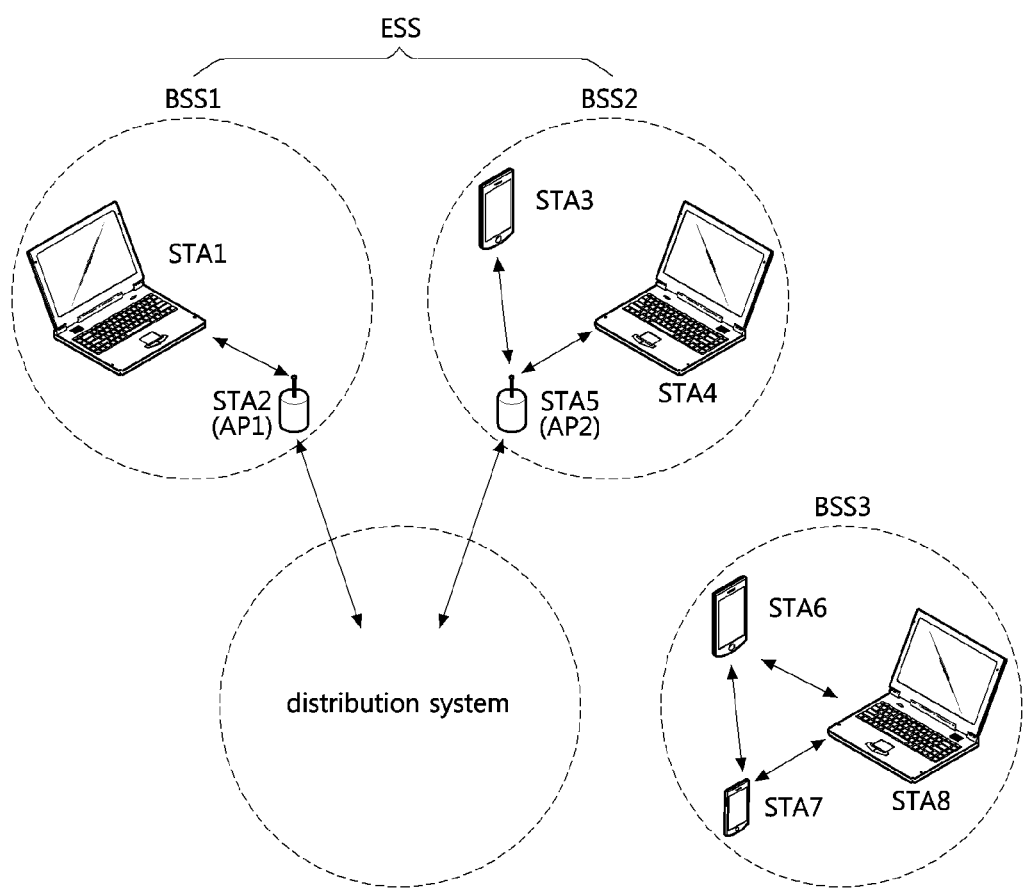
FIG. 1 is a diagram illustrating a first exemplary embodiment of a WLAN system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise', 'have', or 'include' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

A wireless communication network to which exemplary embodiments according to the present disclosure are applied will be described. The wireless communication network to which the exemplary embodiments according to the present disclosure are applied is not limited to the contents described below, and the exemplary embodiments according to the present disclosure may be applied to various wireless communication networks.

FIG. 1 is a diagram illustrating a first exemplary embodiment of a wireless LAN system.

As shown in FIG. 1, a wireless LAN system may include at least one basic service set (BSS). The BSS denotes a set of stations (STAs) (e.g., STA1, STA2 (i.e., AP1), STA3, STA4, and STA5 (i.e., AP2), STA6, STA7, and STA8) configured to communicate with each other through successful synchronization. The BSS does not necessarily denote a specific area. In exemplary embodiments below, a station that performs a function of an access point may be referred to as an "access point (AP)", and a station that does not perform the function of an access point may be referred to as a "non-AP station" or "station".

The BSSs may be classified as infrastructure BSSs and independent BSSs (IBSSs). In particular, a BSS1 and a BSS2 may be infrastructure BSSs, and a BSS3 may be an IBSS. The BSS2 may include a third station STA3, a fourth station (STA4), a second access point (STA5 (AP2)) providing a distribution service, and a distribution system (DS) connecting a plurality of access points (i.e., STA2 (AP1), STA5 (AP2)).

The BSS3 may be an IBSS operating in an ad-hoc mode. In the BSS3, there is not an AP that is a centralized management entity performing management functions at a center. In other words, in the BSS3, the stations STA6, STA7, and STA8 may be managed in a distributed manner.

In the BSS1 or BSS2, communication between the stations STA1, STA3, and STA4 may be generally performed through the access points (STA2 (AP1), STA5 (AP2)), but when direct links are configured, direct communication between the stations STA1, STA3, and STA4 may be possible.

A plurality of infrastructure BSSs may be interconnected via a DS. A plurality of BSSs connected via a DS is referred to as an extended service set (ESS). The stations (e.g., STA1, STA2 (i.e., AP1), STA3, STA4, and STA5 (i.e., AP2)) included in an ESS may be configured to communicate with each other, and a station (e.g., STA1, STA3, or STA4) in the ESS may move from one BSS to another BSS while performing seamless communication.

Each of the communication nodes (e.g., STA1, STA2 (AP1), STA3, STA4, STA5 (AP2), STA6, STA7, and STA8) included in the wireless LAN system may be configured as follows.

Figure 2:
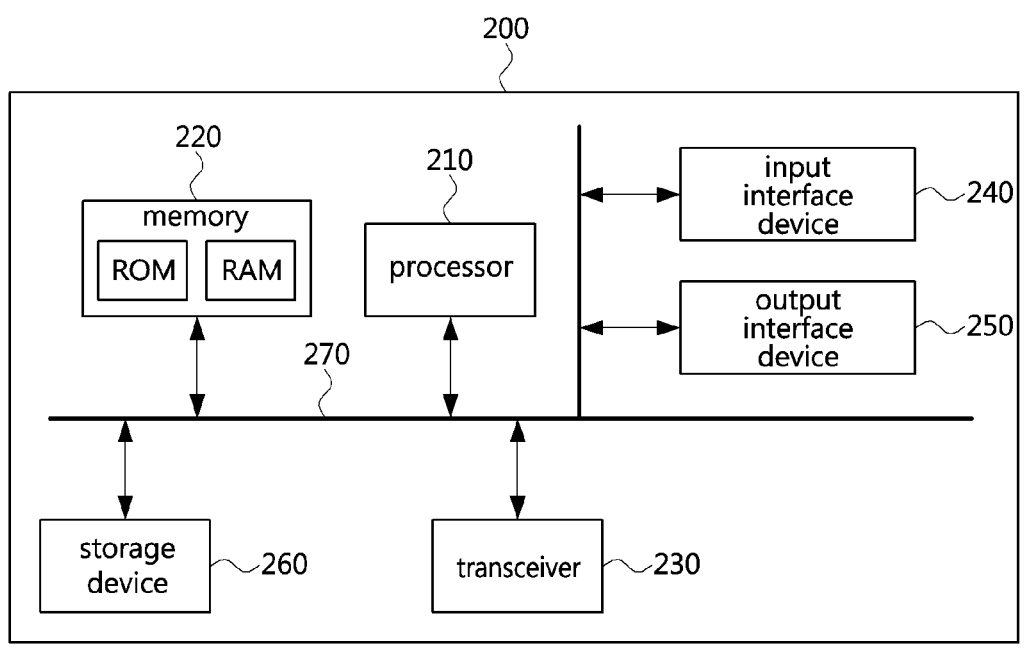
FIG. 2 is a block diagram illustrating an exemplary embodiment of a communication node constituting a WLAN system.

FIG. 2 is a block diagram illustrating an exemplary embodiment of a communication node configured as a WLAN system.

As shown in FIG. 2, a communication node 200 may include at least one processor 210, a memory 220, and a transceiver 230 connected to a network for performing communications. The transceiver 230 may also be referred to as a "radio frequency (RF) unit", "RF module", or the like. Additionally, the communication node 200 may further include an input interface device 240, an output interface device 250, a storage device 260, and the like. Each component included in the communication node 200 may be configured to communicate with each other as connected via a common bus 270.

However, each of the components included in the communication node 200 may be connected to the processor 210 via a separate interface or a separate bus rather than the common bus 270. For example, the processor 210 may be connected to at least one of the memory 220, the transceiver 230, the input interface device 240, the output interface device 250, or the storage device 260 via a dedicated interface.

The processor 210 may be configured to execute at least one instruction stored in at least one of the memory 220 or the storage device 260. The processor 210 may refer to a central processing unit (CPU), a graphics processing unit (GPU), or a dedicated processor. Methods in accordance with exemplary embodiments of the present disclosure may be performed by the processor 210. Each of the memory 220 and the storage device 260 may include at least one of a volatile storage medium or a non-volatile storage medium. For example, the memory 220 may include at least one of read-only memory (ROM) or random access memory (RAM).

Meanwhile, in the WLAN system, an association procedure may be performed as follows.

Figure 3:
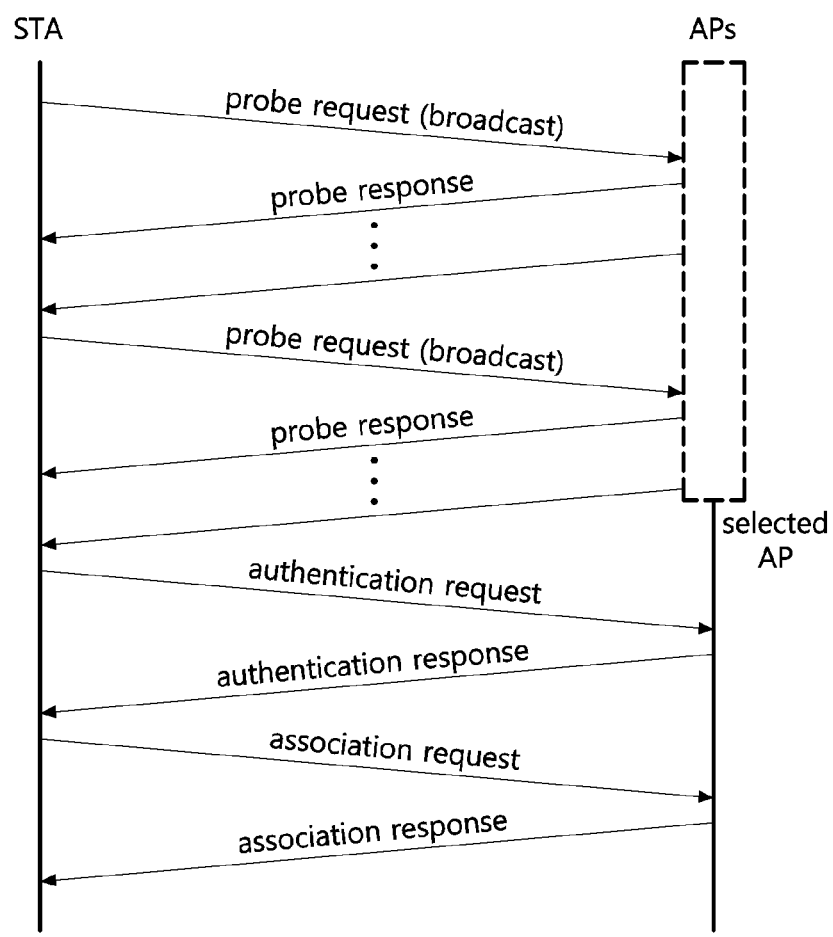
FIG. 3 is a sequence chart illustrating an association procedure of a station in a WLAN system according to an exemplary embodiment.

FIG. 3 is a sequence chart illustrating an association procedure of a station in a WLAN system.

As shown in FIG. 3, an association procedure of a station STA in an infrastructure BSS may generally be divided into a probe step of probing an AP, an authentication step for authentication with the probed AP, and an association step of associating with the authenticated AP. After the association step is completed, an authentication step between the STA and the AP may be additionally performed.

The STA may first detect neighboring APs using a passive scanning scheme or an active scanning scheme. When the passive scanning scheme is used, the STA may detect neighboring APs by overhearing beacons transmitted by the APs. When the active scanning scheme is used, the STA may transmit a probe request frame, and may detect neighboring APs by receiving probe response frames from the AP. The response frames are transmitted as responses to the probe request frames.

When the neighboring APs are detected, the STA may perform an authentication step with the detected APs. In this case, the STA may perform the authentication step with a plurality of APs. An authentication algorithm according to the IEEE 802.11 standard may be classified into an open system algorithm of exchanging two authentication frames, a shared key algorithm of exchanging four authentication frames, and the like.

The STA may transmit an authentication request frame based on the authentication algorithm according to the IEEE 802.11 standard, and may complete authentication with the AP by receiving an authentication response frame that is a response to the authentication request frame from the AP.

When the authentication with the AP is completed, the STA may perform an association step with the AP. In particular, the STA may select one AP among authenticated APs, and perform the association step with the selected AP. That is, the STA may transmit an association request frame to the selected AP, and may complete the association with the AP by receiving an association response frame that is a response to the association request frame from the selected AP.

In order to perform a multi-link operation, the wireless AP may exchange information on whether a multi-link operation is usable in a counter terminal and information on available links during the scanning process for performing the radio access procedure. In a negotiation procedure for a multi-link operation, the terminal may indicate information on link(s) to be used for the multi-link operation. In this case, the negotiation procedure for the multi-link operation may be performed in the association step, and the multi-link operation may be configured and changed through the negotiation procedure using a separate action frame. Additionally, after allocating information on available links of the wireless AP and an ID for each link in the association procedure between the wireless AP and the terminal, the ID may be used to transmit information on whether to enable each link in the negotiation and change procedure for the multi-link operation. The procedure of exchanging information on whether a multi-link operation is usable may be made through exchange of capability elements (e.g., EHT capability elements) of the terminal and the wireless AP, and the capability elements may include information such as supported bands, information on supported links, the number of supported links, and information on a separation between bands that allows simultaneous transmission and reception operations in the corresponding device. Alternatively, the information for each supported link may include indications whether simultaneous transmission and reception operations are possible for each of other supported links.

Figure 4:
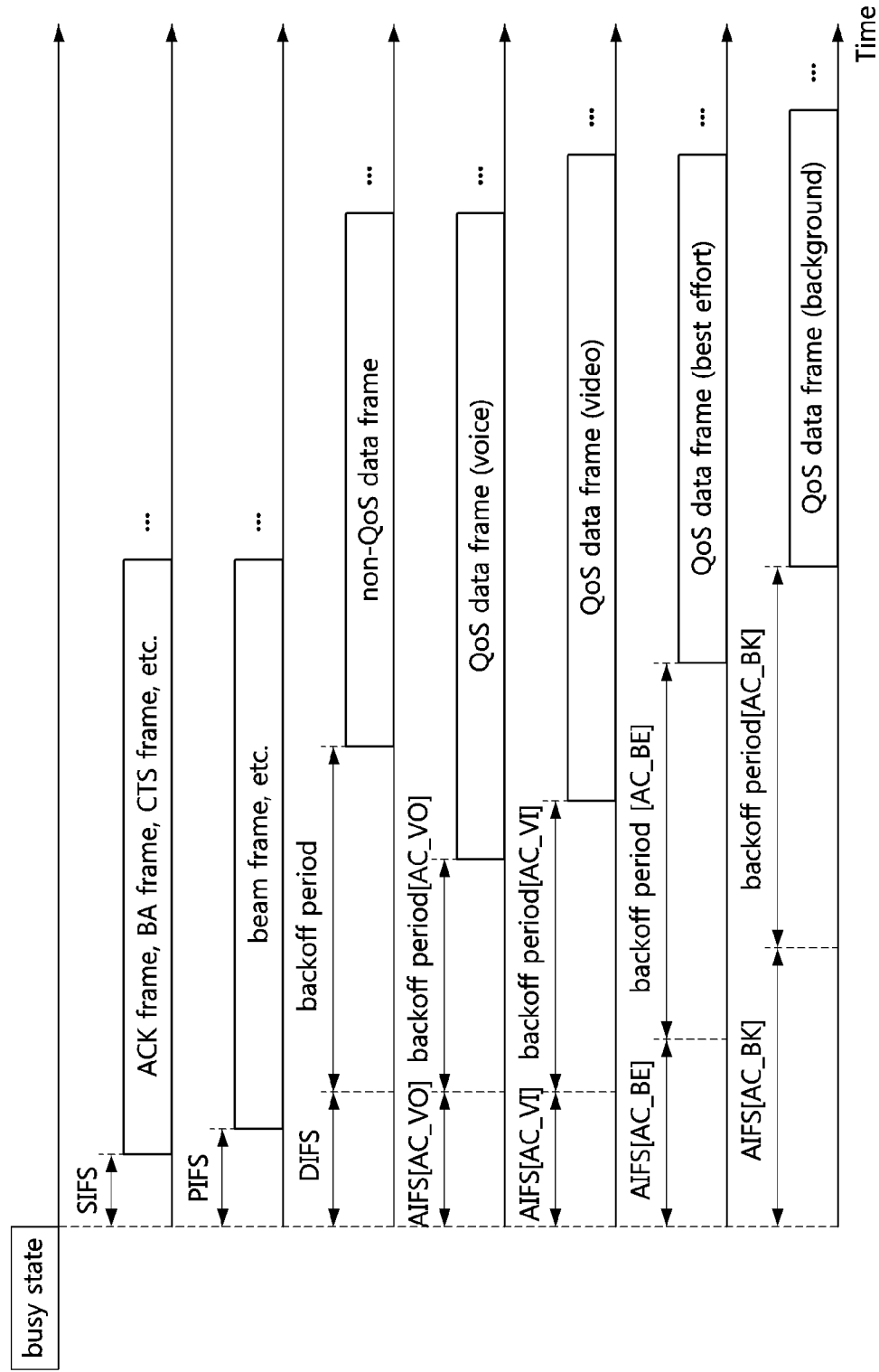
FIG. 4 is a timing diagram illustrating a first exemplary embodiment of an operation method of a communication node based on an EDCA.

FIG. 4 is a timing diagram illustrating a first exemplary embodiment of an operation method of a communication node based on an EDCA.

As shown in FIG. 4, a communication node intending to transmit a control frame (or management frame) may be configured to perform a monitoring operation (e.g., carrier sensing operation) on a channel state during a predetermined period (e.g., short interframe space (SIFS) or PCF IFS (PIFS)). When the channel state is determined to be idle during the predetermined period (e.g., SIFS or PIFS), the communication node may be configured to transmit a control frame (or management frame). In particular, the carrier sensing operation may be referred to as a clear channel assessment (CCA) operation.

A communication node intending to transmit a non-QoS data frame may be configured to perform a monitoring operation (e.g., carrier sensing operation) on a channel state during a DCF IFS (DIFS). When the channel state is determined to be idle during a DIFS, the communication node may be configured to perform a random backoff procedure. For example, the communication node may be configured to select a backoff value (e.g., backoff counter) within a contention window based on the random backoff procedure, and perform the monitoring operation (e.g., carrier sensing operation) during a period corresponding to the selected backoff value. The communication node may be configured to transmit a non-QoS data frame when the channel state is determined to be idle during the backoff period.

A communication node intending to transmit a QoS data frame may perform a monitoring operation (e.g., carrier sensing operation) on a channel state during an arbitration IFS (AIFS). When the channel state is determined to be idle during an AIFS, the communication node may be configured to perform a random backoff procedure. The AIFS may be set based on an access category (AC) of a data unit (e.g., protocol data unit (PDU)) included in the QoS data frame. The AC of the data unit may be as shown in Table 1 below.

TABLE 1

| Priority | AC | Description |
|---|---|---|
| Lowest | AC_BK | Background |
| . | AC_BE | Best effort |
| . | AC_VI | Video |
| . | AC_VO | Voice |
| Highest | | |

In the random backoff procedure, the communication node may be configured to select a backoff value (e.g., backoff counter) within a contention window based on the AC of the QoS data frame. The contention window based on the AC may be as shown in Table 2 below. As shown below, $CW_{min}$ may indicate the minimum value of the contention window, $CW_{max}$ may indicate the maximum value of the contention window, and each of the minimum and maximum values of the contention window may be expressed by the number of slots.

TABLE 2

| AC | $CW_{min}$ | $CW_{max}$ |
|---|---|---|
| AC_BK | 31 | 1023 |
| AC_BE | 31 | 1023 |
| AC_VI | 15 | 31 |
| AC_VO | 7 | 15 |

The communication node may be configured to perform a monitoring operation (e.g., carrier sensing operation) on the channel state during a backoff period, and transmit the QoS data frame when the channel state is determined to be idle during the backoff period.

Figure 5:
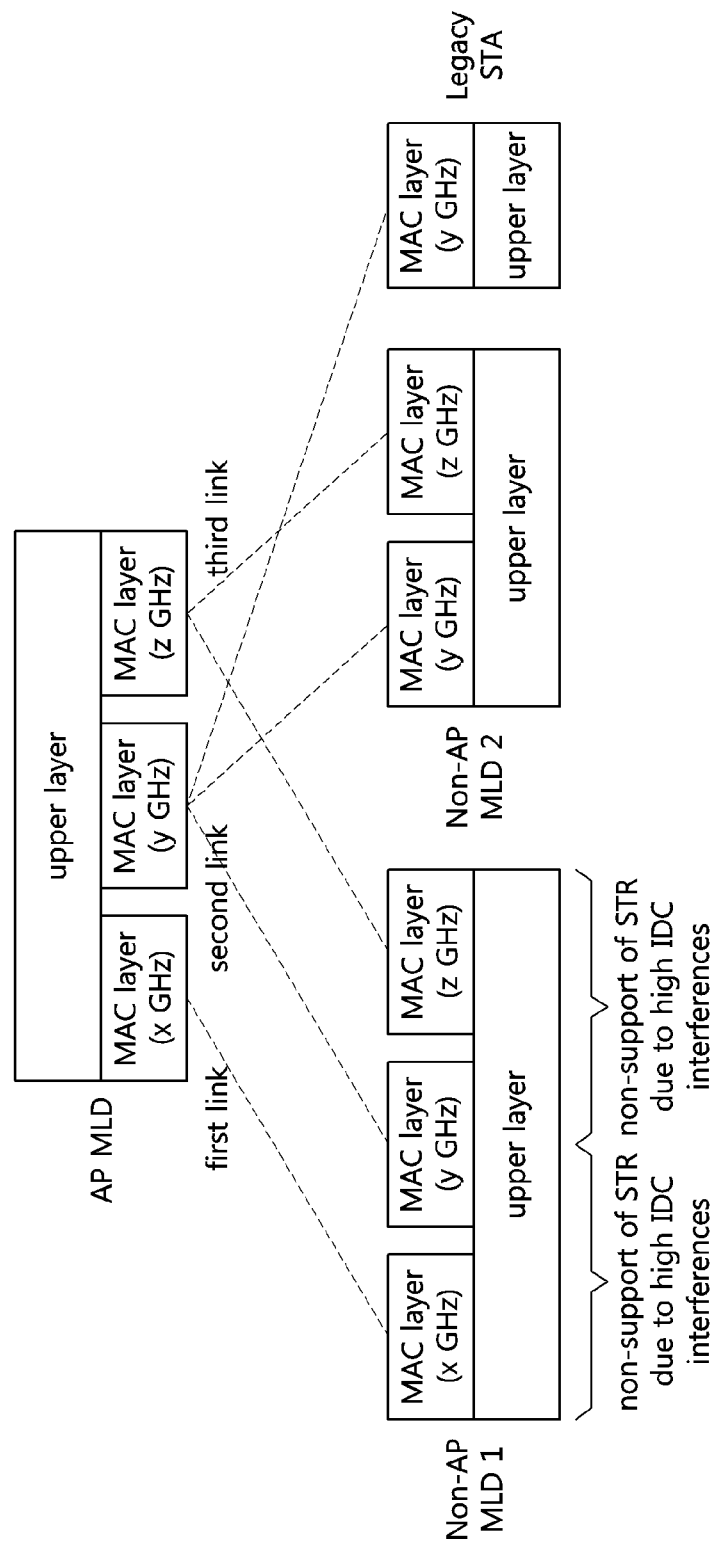
FIG. 5 is a conceptual diagram illustrating an exemplary embodiment of a structure of a multi-link connection established between multi-link devices.

FIG. 5 is a conceptual diagram illustrating an exemplary embodiment of a structure of a multi-link connection established between multi-link devices.

As shown in FIG. 5, a multi-link device (MLD) may transmit and receive frame(s) on a multi-link by applying a non-continuous bandwidth extension technique (e.g., 80 MHz+80 MHz transmission). An AP MLD or non-AP (STA) MLD, which is the multi-link device, may further include AP communication nodes or STA communication nodes that operate on the respective links. Each of the communication nodes of the AP MLD or non-AP MLD may have a different MAC address.

The multi-link device may perform multi-band transmission. For example, the multi-link device may perform frame transmission using a 40 MHz bandwidth in a 2.4 GHz band through a channel extension scheme, and perform frame transmission using a 160 MHz bandwidth in a 5 GHz band through a channel extension scheme. Alternatively, the multi-link device may perform communication using a 160 MHz bandwidth in a 6 GHz band while performing communication using a 160 MHz bandwidth in the 5 GHz band. One frequency band used by the multi-link device may be defined as one link. Alternatively, the multi-link device may configure a plurality of links in one frequency band. For example, the multi-link device may configure one link in the 2.4 GHz band and two links in the 6 GHz band.

The AP MLD and the non-AP STA MLD, which is a multi-link device supporting the multi-link operation, may perform an association operation and a negotiation operation for the multi-link operation to configure the number of links and links to be used. The non-AP MLD may identify information on band(s) capable of performing communication with the AP MLD. The non-AP MLD may configure some or all of the links supported by the AP MLD to be used for the multi-link operation in the negotiation procedure for the multi-link operation with the AP MLD.

A terminal that does not perform a multi-link operation (e.g., IEEE 802.11a/b/g/n/ac/ax terminal) may be connected to some links supported by the AP MLD.

When a separation between bands in the multi-link is sufficient, the multi-link device may receive PPDU(s) on some links of the multi-link while transmitting PPDU(s) on some other links of the multi-link.

On the other hand, when the multi-link device simultaneously performs PPDU transmission/reception operations in a situation where the separation between bands is insufficient, in-device coexistence interference (IDC interference), which is interference between the links, may occur. That is, when the separation between bands in the multi-link is insufficient, the multi-link device may not be able to receive PPDU(s) on some links of the multi-link while transmitting PPDU(s) on some other links of the multi-link.

For example, the non-AP MLD may configure a multi-link including a first link, a second link, and a third link with the AP MLD. If a separation between the first link and the third link is sufficient, the non-AP MLD may transmit a frame on the first link and receive a frame on the third link at the same time. On the other hand, if a separation between the first link and the second link is not sufficient, the non-AP MLD transmitting a frame on the first link may not be able to simultaneously receive a frame on the second link.

Figure 6:
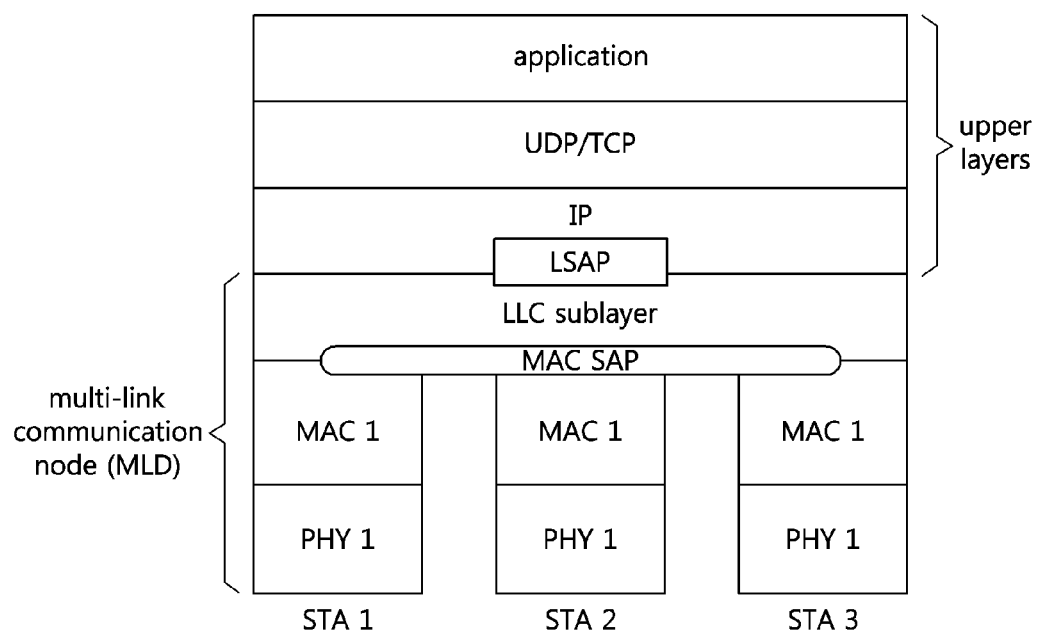
FIG. 6 is a conceptual diagram illustrating an exemplary embodiment of a structure of layers of a multi-link device.

FIG. 6 is a conceptual diagram illustrating an exemplary embodiment of a structure of layers of a multi-link device.

As shown in FIG. 6, a communication node included in a multi-link device may include a plurality of layers. The uppermost layer of the communication node may be an application layer. In addition, the communication node may include a transport layer that guarantees transmission reliability of both ends as a lower layer of the application layer, and according to an exemplary embodiment, a user datagram protocol (UDP)/transmission control protocol (TCP) may perform operations of the transport layer. As a lower layer of the transport layer, the communication node may include a networking layer that identifies a transmission path among several nodes and performs delivery through the corresponding path, and according to an exemplary embodiment, an Internet protocol (IP) layer may perform operations of the networking layer.

In addition, the communication node may further include a data link layer for performing point-to-point transmission. The data link layer may further include a logical link control (LLC) layer and a medium access control (MAC) layer.

In addition, the communication node may further include a physical layer that transmits an actual signal between points.

According to an exemplary embodiment of the present disclosure, the multi-link device may further include one or more per-link physical layers and per-link MAC layers for the multi-link operation. Each of the per-link MAC layers may have a different MAC address.

According to another exemplary embodiment of the present disclosure, the multi-link device may further include a manager for managing communication nodes independent of each other. The multi-link device may include a plurality of communication nodes, and each of the communication nodes may be composed of a physical layer and a MAC layer. In addition, the multi-link device may further include a manager for managing the communication nodes, and the manager of the multi-link device may be logically configured.

In case of communications between vehicle terminals, since a transmitting terminal directly transmits data to a receiving terminal, a process of transmitting data to a destination through several network nodes is not required, and thus the roles of the transport layer and the data link layer in the existing network layers may not be necessary. Accordingly, in order to simplify the functions of the networking layer and the data link layer, the multi-link device may further include a wireless access in vehicular environments (WAVE) Short Message Protocol (WSMP) that performs the functions of the transport layer and the data link layer. That is, WAVE WSMP may replace the transport layer and data link layer of the multi-link device.

Meanwhile, for operations in each layer, the upper layers of the multi-link communication device may exchange data and additional information with the lower layers through a service access point (SAP). For example, the LLC layer may obtain data and parameters such as a source address and a destination address from the WSMP or IP layer through a link service access point (LSAP). In particular, in case where data is transmitted through the WSMP, the LLC layer may obtain a channel load parameter and the like measured by the communication node through the LSAP. The LSAP used in the WAVE may have the same parameters as the SAP parameters used in the existing WLAN, except for DL-UNITDATA.request, which is a parameter received from the upper layer. The DL-UNITDATA.request may further include parameters for WAVE-related operations or multi-link operations, and may be transmitted in form of DL-UNITDATAX.request. The DL-UNITDATAX.request may be configured as follows.

```
DL-UNITDATAX.request (
    source_address,
    destination_address,
    data,
    priority,
    Channel Identifier,
    Time Slot,
    Data Rate,
    TxPwr_Level,
    Channel Load,
```

-continued

WsmExpiryTime
Minimum Data Rate
Delay Requirement
Required Jitter
Preferred Link ID
Channel Load per Link
Traffic Identifier (TID)
)

The respective parameters included in DL-UNITDA-TAX.request may be as shown in Table 3 below.

TABLE 3

| Parameters | Description |
|---|---|
| source_address | Source address as used in the existing wireless LAN |
| destination-address | Destination address as used in the existing wireless LAN |
| data | Same as used in the existing wireless LAN |
| priority | Priority between communication nodes as used in the existing wireless LAN |
| Channel identifier | indicates a channel for transmitting a WSM |
| Time slot | indicates a time slot in which a corresponding message is to be transmitted (i.e., time slot 0 or 1) in association with channel switching operating defined in WAVE |
| Data rate | indicates a data rate used for transmitting a WSM |
| TxPwr_Level | indicates a transmit power used for transmitting a WSM |
| Channel Load | indicates a channel load measured (or recognized) by the communication node |
| WsmExpiryTime | optionally included when transmitted through a WSMP. A frame is not transmitted when the corresponding time expires. |
| Minimum Data Rate | A minimum data rate that data to be transmitted should satisfy. When transmitted through a wireless LAN link, the data rate should be greater than this value. |
| Delay Requirement | A delay requirement that data to be transmitted should satisfy. When transmitted through a wireless LAN link, the delay should be equal to or less than this value. |
| Required Delay Jitter | A jitter requirement that data to be transmitted should satisfy. When transmitted through a wireless LAN link, the jitter equal to or less than this value is allowed. |
| Preferred Link ID | Identifier of a preferred link, which may be set according to a service of corresponding data |
| Channel Load per Link | Channel load for each link. When a plurality of links exist, channel loads for the respective links are transmitted. |
| Traffic Identifier (TID) | A traffic identifier corresponding to a service of data to be transmitted, which may be assigned for each link. |

Some of the parameters received through the LSAP may be transmitted to another terminal by being included in a WSMP message transmitted by the terminal, or used to determine whether to perform a specific function of the lower layer. In this case, whether or not to use an additional function of the MAC may be delivered to the MAC layer through a MAC SAP, thereby performing the corresponding operations. In this case, whether or not to use the function may be delivered to the MAC layer by adding a parameter to MA-UNITDATA.request of the MAC SAP of the existing WLAN or MA-UNITDATAX.request used in the IEEE 1609.4.

Figure 7:
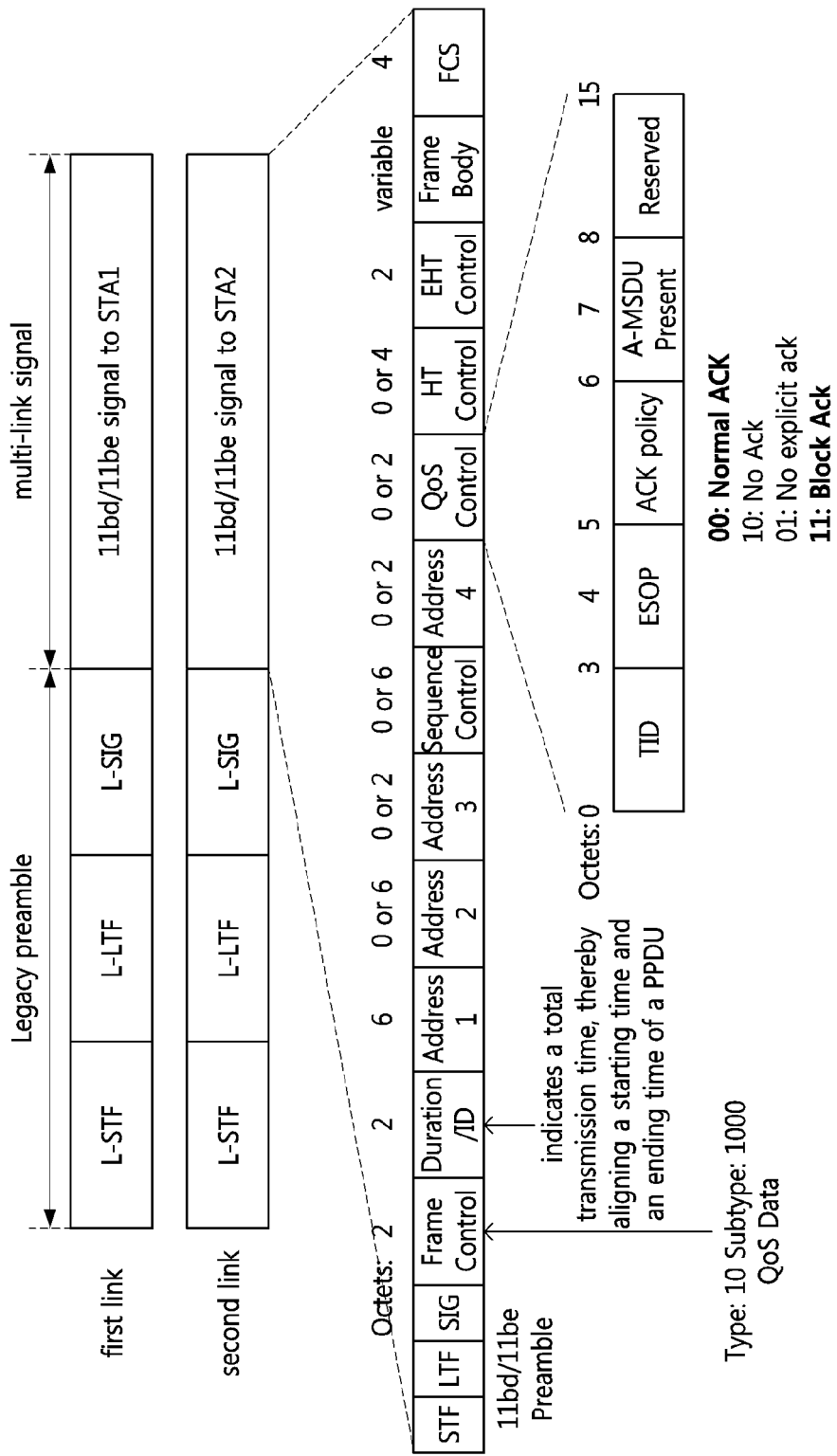
FIG. 7 is a conceptual diagram illustrating an exemplary embodiment of configuration of a multi-link PPDU transmitted on a multi-link.

FIG. 7 is a conceptual diagram illustrating an exemplary embodiment of configuration of a multi-link PPDU transmitted on a multi-link.

As shown in FIG. 7, a first multi-link device may configure a multi-link (ML) physical layer protocol data unit (PPDU) for transmitting data to a second multi-link device configured with at least one communication node. The first multi-link device may configure an ML PPDU transmitted on a plurality of links in a frequency division multiple access (FDMA) scheme. The FDMA scheme may refer to a scheme of transmitting and receiving PPDUs by using different links for respective communication nodes of one multi-link device. Accordingly, each of the communication nodes of the multi-link device may modulate/demodulate data using a different frequency band, and each of the communication nodes affiliated with the multi-link device may not be required to modulate/demodulate the data with the restriction to use a specific frequency division scheme.

The multi-link device may perform frame transmission using a 40 MHz bandwidth in a frequency band allocated for each link through a 20 MHz channel extension scheme, and perform frame transmission using a 160 MHz bandwidth in a 5 GHz band through a channel extension scheme. Alternatively, the multi-link device may perform communication using a 160 MHz bandwidth in a 6 GHz band while performing communication through a 160 MHz bandwidth in the 5 GHz band.

One frequency band used by the multi-link device may be defined as one link. Alternatively, the multi-link device may configure a plurality of links in one frequency band. For example, the multi-link device may configure one link in the 2.4 GHz band and two links in the 6 GHz band. In the case of vehicle communication, 10 MHz channels may be used, and the channels may be used as being extended to a 20 MHz channel.

Each of the PPDUs transmitted through different links may include a legacy preamble, a preamble used in the IEEE 802.11bd or IEEE 802.11be, and data. The legacy preamble may include a legacy short training field (L-STF), a legacy long training field (L-LTF), and a legacy signal (L-SIG).

The data may include a MAC header and a payload. The MAC header may indicate QoS data by setting Type to '10' and Subtype to '1000' in a frame control field. In case of the QoS data, a QoS control field included in the MAC header may indicate TID information and an ACK policy. Since the MAC header includes a duration field, a total transmission time of the PPDU may be indicated based on the ACK policy field. When the ACK policy field is set to '00: Normal ACK', the duration field may indicate 'time required for completing transmission of the current PPDU+SIFS+ACK transmission time'. That is, the duration field may indicate an ending time of the ACK. When the ACK policy field is set to '11: 'Block ACK', the duration field may determine whether to use the Immediate Block ACK scheme or the Delayed Block ACK scheme through an ADDBA request frame and an ADDBA response frame exchanged before data transmission. When the determined Block ACK scheme is the Immediate Block ACK scheme and the ACK policy field of the QoS Control field is set to '11', the duration field may indicate 'time required for completing transmission of the current PPDU+SIFS+Block ACK transmission time'.

That is, the duration field may indicate an ending time of the Block ACK.

The IEEE 802.11bd preamble of the ML PPDU may include a Next Generation Vehicle (NGV) STF and a NGV LTF, which are parts required for synchronization, and a SIG field (e.g., NGV SIG), which includes elements required for decoding NGV signals. Alternatively, the IEEE 802.11be preamble of the ML PPDU may include an Extreme High Throughput (EHT) STF and a EHT LTF, which are parts required for synchronization, and a SIG field (e.g., EHT SIG), which includes elements required for decoding EHT signals. In addition, the NGV/EHT SIG field may include an ID of a receiving communication node allocated for each link.

Alternatively, the MAC header of the PPDU transmitted on each link may further include information on an ID of a receiving communication node allocated for each link. Each ID may be a MAC address. Alternatively, if a receiving communication node for each link has already been negotiated before transmission of the ML PPDU or a service for data used in the corresponding link is determined, the ID field of the receiving communication node allocated for each link may be omitted in the NGV/EHT SIG field. The data may be received as a frame in the MAC layer, and an address field of the frame may include an individual address or a group address for each terminal. Alternatively, when data transmitted in the signal of each link are for different type of services, each frame for the data may be transmitted as broadcast frame. On the other hand, when configuring the ML PPDU, the PPDUs of the respective links may not have the same length due to a difference in data amount or the like. Therefore, the multi-link device may configure the ML PPDU by adding padding to the original PPDU, so that lengths of the PPDUs of the respective links are aligned.

The multi-link device may configure each of the PPDUs of the ML PPDU separately so that a transmission starting time and a transmission ending time are the same for each link as shown in FIG. 7. The multi-link device may transmit the configured PPDUs of ML PPDU simultaneously. The ML PPDU may be transmitted on a plurality of links configured by one multi-link device and separated by frequencies. The ML PPDU may be transmitted to a plurality of communication nodes.

Alternatively, according to another exemplary embodiment of the present disclosure, the data part of the ML PPDU may be configured in an Orthogonal Frequency Division Multiple Access (OFDMA) scheme. When the multi-link device transmits the ML PPDU using two links, the PPDU transmitted on each link may be transmitted to a plurality of communication nodes by using the OFDMA scheme. In this case, when the ML PPDU is used for vehicle communication, the NGV/EHT SIG field within the ML PPDU configured in the OFDMA scheme may further include a resource unit (RU) allocation field which is information on tones allocated to the MU PPDU. The RU allocation field may indicate the size of the tones allocated to the ML PPDU, and the like. When the ML PPDU is configured according to the OFDMA scheme, subcarriers of the PPDU transmitted on each link may be configured in the same or similar form as the HE MU PPDU of IEEE 802.11ax. For example, when the ML PPDU is transmitted using a total bandwidth of 20 MHz in vehicle communication, a 10 MHz bandwidth signal transmitted on each link may be composed of 242 tones. Accordingly, the RU allocation field may be configured with 8 bits, and in particular, the RU allocation field may be configured as shown in Tables 4 and 5 below according to the number of communication nodes to which resources are to be allocated and tones used.

TABLE 4

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |
| 00001011 | 52 | | 26 | 26 | 26 | 52 | | 52 | | 1 |
| 00001100 | 52 | | 52 | | 26 | 26 | 26 | 26 | 26 | 1 |
| 00001101 | 52 | | 52 | | 26 | 26 | 26 | 52 | | 1 |
| 00001110 | 52 | | 52 | | 26 | 52 | | 26 | 26 | 1 |
| 00001111 | 52 | | 52 | | 26 | 52 | | 52 | | 1 |

TABLE 5

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00010$y_2y_1y_0$ | 52 | | 52 | | — | | 106 | | | 8 |
| 00011$y_2y_1y_0$ | | 106 | | | — | 52 | | 52 | | 8 |
| 00100$y_2y_1y_0$ | 26 | 26 | 26 | 26 | 26 | | 106 | | | 8 |
| 00101$y_2y_1y_0$ | 26 | 26 | | 52 | 26 | | 106 | | | 8 |
| 00110$y_2y_1y_0$ | 52 | | 26 | 26 | 26 | | 106 | | | 8 |
| 00111$y_2y_1y_0$ | 52 | | 52 | | 26 | | 106 | | | 8 |
| 01000$y_2y_1y_0$ | | 106 | | | 26 | 26 | 26 | 26 | 26 | 8 |
| 01001$y_2y_1y_0$ | | 106 | | | 26 | 26 | 26 | 52 | | 8 |
| 01010$y_2y_1y_0$ | | 106 | | | 26 | 52 | | 26 | 26 | 8 |
| 01011$y_2y_1y_0$ | | 106 | | | 26 | 52 | | 52 | | 8 |
| 0110$y_1y_0z_1z_0$ | | 106 | | | — | | 106 | | | 16 |
| 01110000 | 52 | | 52 | | — | 52 | | 52 | | 1 |
| 11000$y_2y_1y_0$ | | | | | 242 | | | | | 8 |
| 11001$y_2y_1y_0$ | | | | | 484 | | | | | 8 |

In Tables 4 and 5, if the RU allocation subfield indicates 106 or more tones, bits $y_2$, $y_1$, and $y_0$ may indicate the number of communication nodes to be multiplexed using MIMO operation corresponding to the RU with 106 or more tones. When a MIMO operation is not used, the bits $y_2$, $y_1$, and $y_0$ may be set to 0. When 106 or more tones are allocated to two or more RUs, $z_2$ and $z_1$ may indicate the number of communication nodes to perform communication in each RU by utilizing a MIMO operation.

After the RU allocation field, user information field(s) corresponding to each RU may be further included. The user information field includes ID(s) of receiving communication node(s) allocated to the respective band(s) divided by the RU allocation field. In this case, the number of included user information fields may be equal to the number of RUs divided by the RU allocation field. Alternatively, when using the MIMO operation, the number of included user information fields may be greater than the number of RUs. Alternatively, when it is desired to designate terminal(s) to be used in a 10 MHz bandwidth channel other than the 10 MHz bandwidth channel including the corresponding preamble, the RU allocation field and the user information field may be included twice.

Alternatively, when transmitted as the ML PPDU in the IEEE 802.11be, if channel extension is performed on each link and 40 MHz transmission is performed on each link, a PPDU transmitted on each link may consist of 484 tones. The RU allocation field may be configured by allocating a minimum of 26 tones to a maximum of 968 tones to each receiving communication node, and a frame including the RU allocation field may be generated and transmitted. For example, a preamble transmitted in each 20 MHz band may allocate RUs to the PPDU in the same or similar form as Tables 4 and 5. Accordingly, the multi-link device may not allocate all tones of a PPDU of the ML PPDU, which is transmitted on one link, to one RU, but may allocate only some tones thereof to one RU. Accordingly, the multi-link device may configure two or more RUs in the PPDU transmitted on one link and transmit the PPDU to two or more communication nodes. Meanwhile, when the PPDU of the ML PPDU is transmitted to one communication node for each link, the RU allocation field may be omitted. Alternatively, when the ML PPDU is transmitted to the same communication nodes as the previously transmitted ML PPDU, the user information field may be omitted.

The upper layer of the multi-link device may determine whether to transmit a frame using an ML PPDU. The lower layer of the multi-link device may receive information on whether to transmit a frame using an ML PPDU through a SAP. For example, when it is determined that configuration of an ML PPDU is necessary in the upper layer, the upper layer of the multi-link device may indicate the lower layer of the multi-link device to use an ML PPDU by including an additional primitive in MA-UNITDATA.request or MA-UNITDATAX.request of the MAC SAP.

Figure 8:
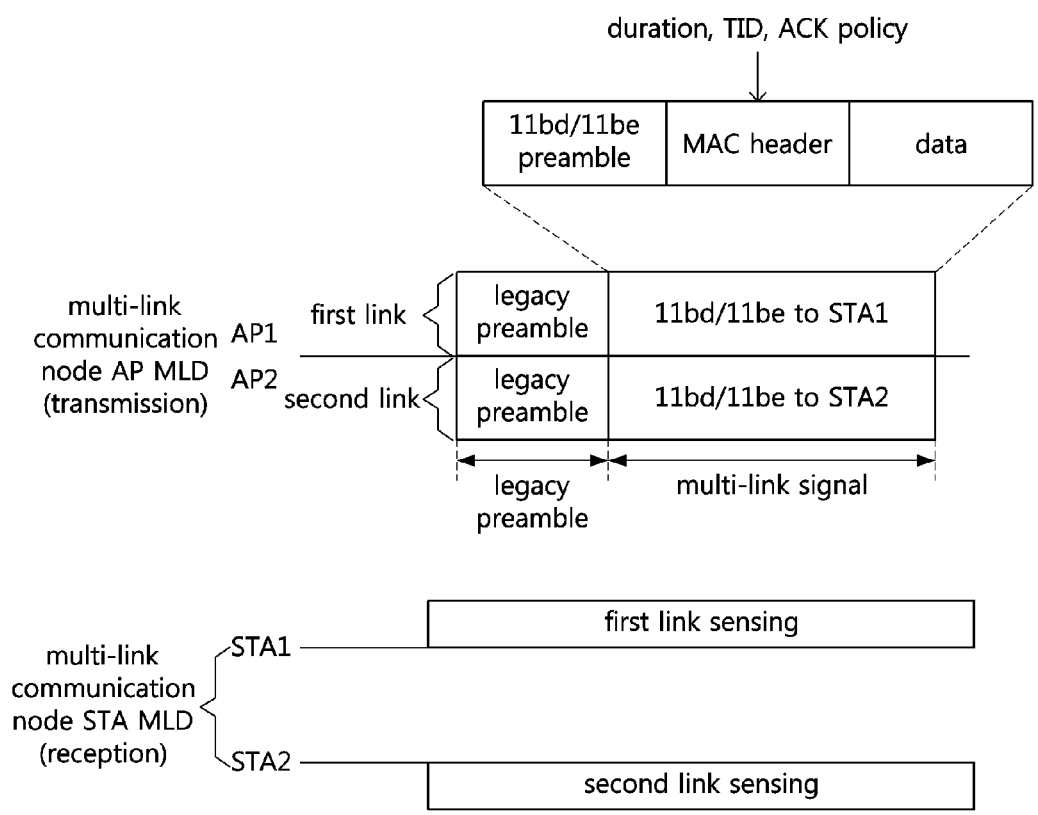
FIG. 8 is a conceptual diagram illustrating a first exemplary embodiment of a multi-link PPDU transmission/reception operation between multi-link devices.

FIG. 8 is a conceptual diagram illustrating a first exemplary embodiment of a multi-link PPDU transmission/reception operation between multi-link devices.

As shown in FIG. 8, a multi-link communication network may include a first multi-link device and a second multi-link device. The first multi-link device may perform an AP operation, and the second multi-link device may perform an STA operation.

The first multi-link device may establish a multi-link connection with the second multi-link device through a plurality of links. The first multi-link device may establish the multi-link connection with the second multi-link device based on TID(s) of PPDU(s) to be transmitted or received. Specifically, a first link mapped to a first TID and a second link mapped to a second TID may be configured with a second multi-link device. As a result of establishing the multi-link connection, the first link may be a link configured between a node #11 included in the first multi-link device and a node #21 included in the second device. Also, the second link may be a link configured between a node #12 included in the first multi-link device and a node #22 included in the second multi-link device. Links mapped to the first TID may be one or more links including the first link, and links mapped to the second TID may be one or more links including the second link.

When the first multi-link device transmits data to the second multi-link device configured with a plurality of communication nodes, the first multi-link device may generate an ML PPDU to increase frequency efficiency which is not using one link at a time. The configuration of the ML PPDU may be the same as that of the ML PPDU shown in FIG. 7. The first multi-link device may transmit the configured ML-PPDU to the second multi-link device.

In order to receive the ML PPDU, each communication node included in the second multi-link device receiving the ML PPDU may sense a link on which each communication node needs to perform reception, which is determined according to a negotiation process with the first multi-link device transmitting the MU PPDU or discriminated according to a service used by the receiving communication node. A traffic identifier (TID) may be configured according to a service of data, and the TID may be assigned to each link. According to an exemplary embodiment, the TID may have a value of 0 to 7, and a priority and an access category (AC) may be mapped according to each value of the TID. The priority may be given by setting different parameters according to the AC when accessing the channel. A relationship between the TID, priority, and AC may be shown in Table 6.

TABLE 6

| Priority | TID | 802.1D specified Traffic | Access Category | designated traffic |
|---|---|---|---|---|
| Lowest | 1 | BK | AC_BK | Background |
|  | 2 | — |  |  |
|  | 0 | BE | AC_BE | Best Effort |
|  | 3 | EE |  |  |
|  | 4 | CL | AC_VI | Video |
|  | 5 | VI |  |  |
|  | 6 | VO | AC_VO | Voice |
| Highest | 7 | NC |  |  |

According to Table 6, a TID 4 may be mapped to a link 2, and a TID 6 may be mapped to a link 3. A transmission priority of the PPDU may be determined based on configuration information of the TID. That is, the TID may further indicate the priority of the PPDU.

When the multi-link device transmits and receives a frame on a link mapped to a TID, the multi-link device may determine that a state of the link mapped to the TID is enabled. Accordingly, the communication node of the multi-link device may sense the link 2 after determining that the state of the link is enabled in order to receive data corresponding to the TID 4. Also, in order to receive data corresponding to the TID 6, the communication node of the multi-link device may sense the link 3 after determining the state of the link 3 as enabled. When the TID 4 is allocated to all the links, link 1, link 2, and link 3, the communication nodes of the multi-link device may transmit data corresponding to the TID 4 through all the links.

Alternatively, when the IEEE 802.11bd or IEEE 802.11be preamble includes an ID field indicating the receiving communication node allocated for each band, the communication node indicated by the ID field may identify a band to be decoded through the IEEE 802.11bd or IEEE 802.11be preamble. Alternatively, the communication node may receive data by identifying the receiving communication node ID of the MAC header included in the PPDU. That is, each of the communication nodes of the second multi-link device may receive a respective frame on a different link.

On the other hand, when the data part of the ML PPDU is configured in the OFDMA scheme, each of the communication nodes of the second multi-link device may identify tones to be decoded based on a form indicated by the RU allocation field in the NGV SIG or EHT SIG and an ID field of the receiving communication node allocated for each band. If the RU allocation field is omitted from the PPDU, the second multi-link device may identify that each RU is configured based on a unit of tones corresponding to each link.

When the data of the ML PPDU requires response frame(s) (e.g., ACK frame(s)), the multi-link devices (e.g., first multi-link device and second multi-link device, etc.) may perform a procedure for transmitting and receiving response frame(s) for the transmission operation of FIG. 8. The multi-link devices (e.g., first multi-link device and second multi-link device, etc.) may transmit and receive the response frame(s) by performing the following operations.

Figure 9:
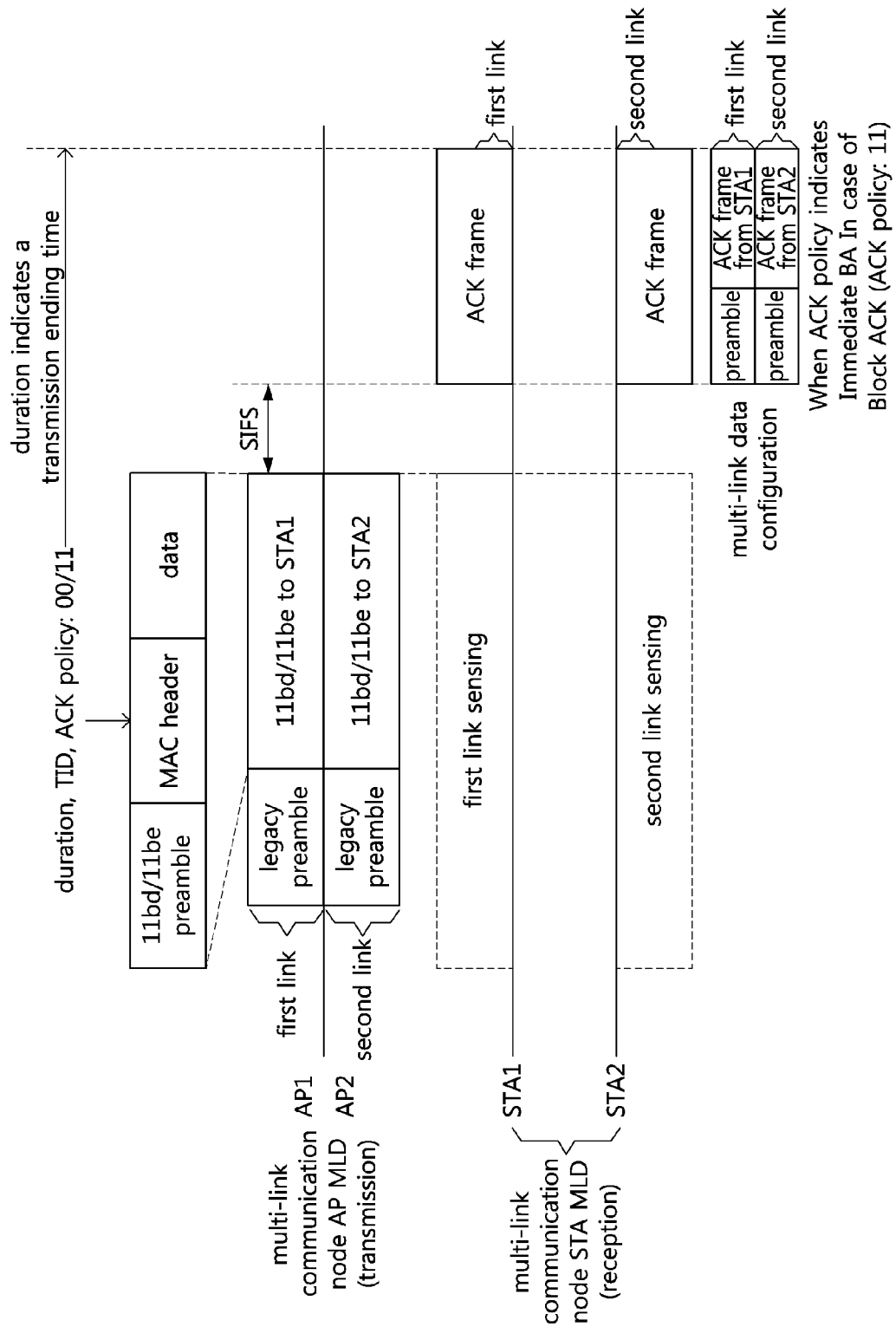
FIG. 9 is a conceptual diagram illustrating a second exemplary embodiment of a multi-link PPDU transmission/reception operation between multi-link devices.

FIG. 9 is a conceptual diagram illustrating a second exemplary embodiment of a multi-link PPDU transmission/reception operation between multi-link devices.

As shown in FIG. 9, a multi-link communication network may include a first multi-link device and a second multi-link device. The first multi-link device may perform an AP operation, and the second multi-link device may perform an STA operation.

The first multi-link device may establish a multi-link connection with the second multi-link device through a plurality of links. The first multi-link device may establish the multi-link connection with the second multi-link device based on TID(s) of PPDU(s) to be transmitted or received. Specifically, a first link mapped to a first TID and a second link mapped to a second TID may be configured with a second multi-link device. As a result of establishing the multi-link connection, the first link may be a link configured between a node #11 included in the first multi-link device and a node #21 included in the second device. Also, the second link may be a link configured between a node #12 included in the first multi-link device and a node #22 included in the second multi-link device. Links mapped to the first TID may be one or more links including the first link, and links mapped to the second TID may be one or more links including the second link.

The first multi-link device may transmit the ML PPDU on the first link and the second link. In addition, the second multi-link device may determine the state of the links mapped to the TID of the PPDU to be received as enabled. The second multi-link device may sense the first link and the second link that are enabled links, and may receive the ML PPDU on the first link and the second link as a result of sensing the first link and the second link.

When the second multi-link device needs to transmit response frame(s) (e.g. ACK frame(s) or Block ACK frame) for data, the second multi-link device may further perform an operation for transmitting the response frame(s) after the operation of receiving the ML PPDU according to FIG. 8.

According to an exemplary embodiment of the present disclosure, the first multi-link device that has transmitted the ML PPDU may transmit a frame requesting ACKs of the communication nodes of the second multi-link device for the ML PPDU. The first multi-link device may piggyback the ACK request frame in the ML PPDU. The ACK request frame may include the length of the PPDU, modulation and coding scheme (MCS), 'duplicate response frame transmission', 'All ACK transmission', and/or the like.

According to another exemplary embodiment of the present disclosure, the first multi-link device may be configured to further include an ACK request field for requesting ACKs of the communication nodes of the second multi-link device in the ML PPDU transmitted on the multi-link. The ACK request field may include the length of the PPDU including the response frame, MCS, 'duplicate response frame transmission', 'All ACK transmission', and/or the like.

When the ACK request frame (or ACK request field) indicates the 'duplicate response frame transmission' information, the communication nodes of the second multi-link device should transmit the same response frame. Accordingly, the second multi-link device may transmit the same response frame on each link by collecting reception states of the PPDUs in all the links. When the ACK request frame (or ACK request field) indicates the 'All ACK transmission' information, the second multi-link device may collect reception states of the PPDUs in all the links, and transmit one response frame by using one or more links.

The second multi-link device may transmit the response frame(s) for the ML PPDU after a preset time period (e.g., short inter-frame spacing (SIFS), etc.) elapses from a time when the reception of the ML PPDU is completed.

Each of the communication nodes of the second multi-link device may configure a response frame for the PPDU received on a different link. That is, each of the communication nodes of the second multi-link device may configure a PPDU including ACK for a different PPDU. The second multi-link device may transmit an ML PPDU including different ACKs to the first multi-link device on different links.

In order for the first multi-link device to simultaneously receive the PPDUs for the respective links, it may be preferable that the communication nodes of the second multi-link device simultaneously start transmitting the PPDUs for the respective links and complete the transmissions at the same time.

The second multi-link device may simultaneously transmit the PPDUs on different links based on the duration field of the MAC header of the ML PPDU transmitted by the first multi-link device. The duration field of the MAC header of the ML PPDU may indicate a PPDU transmission time of the ML PPDU and the ACK therefor based on the ACK policy. When the ACK policy field is set to '00: Normal ACK', the duration field may indicate 'time required for completing transmission of the current PPDU+SIFS+ACK transmission time'. That is, the duration field may indicate an ending time of the ACK. When the ACK policy field is set to '11: Block ACK', the multi-link devices may negotiate whether to use the Immediate Block ACK scheme or the Delayed Block ACK scheme through an ADDBA request frame and an ADDBA response frame before ML PPDU transmission. When the negotiated block ACK scheme is the immediate Block ACK scheme and the ACK policy field of QoS Control is set to '11', the duration field may indicate 'time required for completing transmission of the current PPDU+SIFS+block ACK transmission time'. That is, the duration field may indicate an ending time of the Block ACK.

The first multi-link device that has transmitted the ML PPDU may simultaneously receive the PPDUs including ACKs on different links from the respective communication nodes of the second multi-link device. That is, the first multi-link device may receive the response frames in the same form as receiving the response frames for the ML PPDU in all links.

According to another exemplary embodiment of the present disclosure, when each PPDU constituting the ML PPDU transmitted by the first multi-link device is not configured on a link basis, it may further include an RU allocation field for an RU in which response frame(s) are to be transmitted, and the corresponding RU allocation field may indicate the number of tones included in the PPDU including the response frames and the location of tones. Alternatively, when the second communication node needs to transmit the response frame(s) on a link other than the links through which data is received, the ML PPDU may further include an RU allocation field for an RU in which the response frame(s) are to be transmitted.

When the RU allocation field allocating the RU in which the response frame(s) are to be transmitted is received, the receiving communication node may configure an uplink (UL) PPDU including data corresponding to the response frame in the corresponding RU, and in this case, each communication node may transmit a legacy preamble and an IEEE 802.11bd or IEEE 802.11be preamble on a link to which the corresponding RU belongs.

According to another exemplary embodiment of the present disclosure, when the first multi-link device does not transmit a frame (or field) requesting ACK(s) for the ML PPDU, the first multi-link device may negotiate whether to transmit ACK(s) in a negotiation procedure with the second multi-link device before transmission of the ML PPDU. Alternatively, the second multi-link device may determine whether to transmit ACK(s) based on whether or not a service including the data is performed.

That is, before transmitting the ML PPDU, the first multi-link device may negotiate with the second multi-link device whether to transmit ACK(s) and a link on which the PPDU including ACK(s) is to be transmitted. The first multi-link device may negotiate whether to transmit ACK(s) with the second multi-link device through an ADDBA request frame and an ADDBA response frame. Alternatively, the first multi-link device may negotiate whether to transmit ACK(s) with the second multi-link device during the association procedure.

According to a result of the ACK negotiation, the second multi-link device may transmit response frame(s) (ACK or block ACK) only on the link(s) in which the PPDU is received. Alternatively, the second-multi-link device may transmit the same response frame indicating the reception states of the PPDUs received on all links (i.e., duplicate response frame transmission). Alternatively, the second multi-link device may transmit a response frame on one link indicating the reception states of the PPDUs received on all links.

On the other hand, the first multi-link device transmitting the ML PPDU may not be able to simultaneously receive the PPDUs transmitted on the respective links from a plurality of communication nodes. When the first multi-link device cannot simultaneously receive the PPDUs on the plurality of links, a reception timing of the response frame may be configured differently for each of the communication nodes of the first multi-link device. The multi-link devices (e.g., first multi-link device and second multi-link device, etc.) may utilize a separate response request frame (e.g., Block ACK request frame) as follows, so that ACK(s) for the ML PPDU may be transmitted and received.

Figure 10:
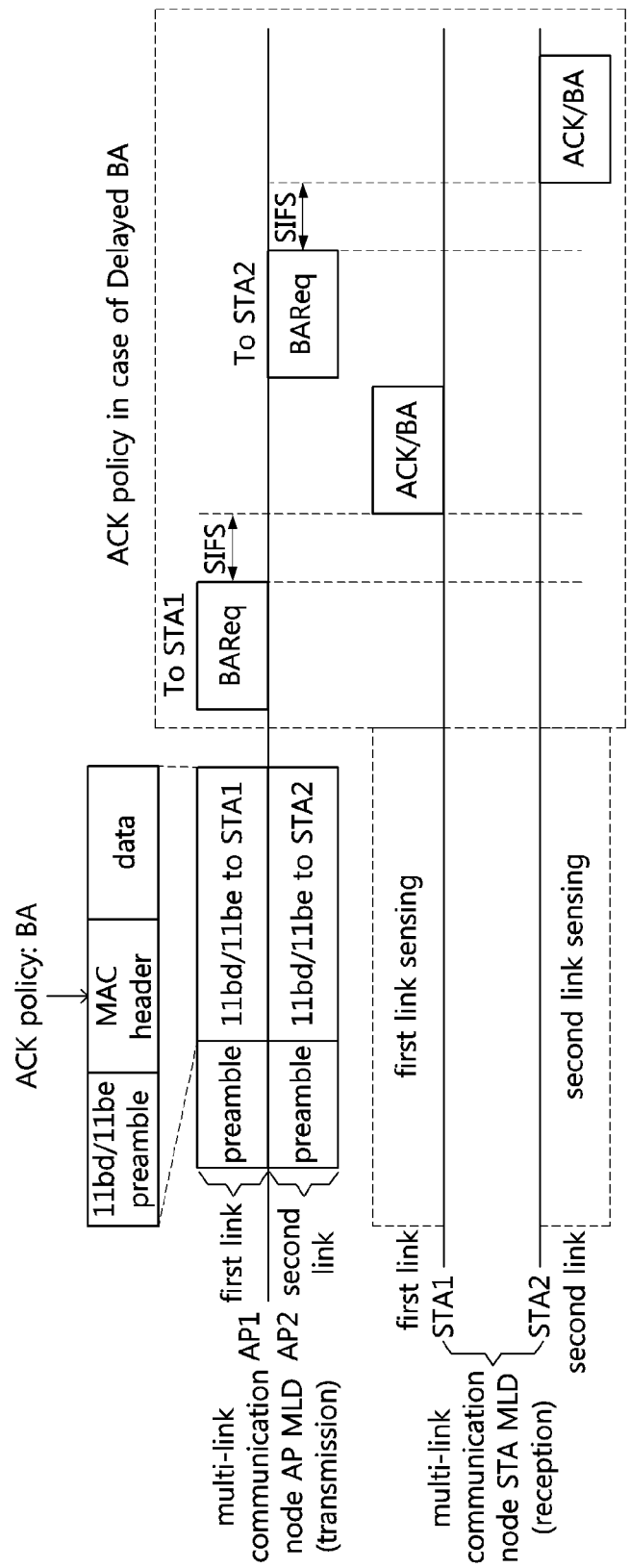
FIG. 10 is a conceptual diagram illustrating a third exemplary embodiment of a multi-link PPDU transmission/reception operation between multi-link devices.

FIG. 10 is a conceptual diagram illustrating a third exemplary embodiment of a multi-link PPDU transmission/reception operation between multi-link devices.

As shown in FIG. 10, a multi-link communication network may include a first multi-link device and a second multi-link device. The first multi-link device may perform an AP operation, and the second multi-link device may perform an STA operation.

The first multi-link device may establish a multi-link connection with the second multi-link device through a plurality of links. The first multi-link device may establish the multi-link connection with the second multi-link device based on TID(s) of PPDU(s) to be transmitted or received. Specifically, a first link mapped to a first TID and a second link mapped to a second TID may be configured with a second multi-link device. As a result of establishing the multi-link connection, the first link may be a link configured between a node #11 included in the first multi-link device and a node #21 included in the second device. Also, the second link may be a link configured between a node #12 included in the first multi-link device and a node #22 included in the second multi-link device. Links mapped to the first TID may be one or more links including the first link, and links mapped to the second TID may be one or more links including the second link.

The first multi-link device may transmit the ML PPDU on the first link and the second link. In addition, the second multi-link device may determine the state of the links mapped to the TID of the PPDU to be received as enabled. The second multi-link device may sense the first link and the second link that are enabled links, and may receive the ML PPDU on the first link and the second link as a result of sensing the first link and the second link.

When the second multi-link device needs to transmit response frame(s) (e.g. ACK frame(s) or Block ACK frame) for data, the second multi-link device may further perform an operation for transmitting the response frame(s) after the operation of receiving the ML PPDU according to FIG. 8.

When the first multi-link device that has transmitted the data frame is not able to decode signals simultaneously transmitted on a plurality of links from a plurality of receiving communication nodes, the first multi-link device may sequentially receive the response frames for the respective communication nodes of the second multi-link device. Alternatively, when the first multi-link device fails to negotiate the frame type and length with the second multi-link device, the first multi-link device may sequentially receive the response frames for the respective communication nodes of the second multi-link device.

For example, when the receiving communication nodes of the second multi-link device transmit the ACK(s) on the multi-link immediately after an SIFS elapses from the reception time of the ML PPDU, the first multi-link device may not be able to decode the ACK frames from the second multi-link device. Accordingly, the receiving communication nodes of the second multi-link device may not transmit the response frame for the received ML PPDU until there is a separate request. The operation of delaying transmission of the response frame of the second multi-link device may be referred to as Delayed-ACK.

After completing the transmission of the ML PPDU on the multi-link, the first multi-link device performing the Delayed BA procedure may transmit a separate response request frame (e.g., Block ACK request frame) to the second multi-link device. The communication node of the second multi-link device may transmit a response frame or a Block ACK frame corresponding to the received response request frame. Accordingly, the first multi-link device may identify whether the transmitted ML PPDU has been received for each link.

In order to perform the Delayed BA procedure, it may be preferable for the communication nodes of the second multi-link device not to transmit a response frame in advance after receive the ML PPDU on each link. Accordingly, before transmission of the ML PPDU, the multi-link devices may negotiate in advance whether to transmit ACK(s). Alternatively, the multi-link devices may negotiate in advance whether to transmit/receive response frames based on service type information included in the data part of the ML PPDU.

When multi-link devices have negotiated whether to transmit/receive response frames based on the service type information included in the data part prior to the transmission of ML PPDU, a specific TID can be configured to perform Delayed-ACK. In this case, if the TID is mapped to the specific link, Delayed-ACK operation may be performed in the same way.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first device in a wireless local area network (WLAN) supporting multi-link operations, the operation method comprising:
    configuring a first link with a second device, the first link being associated with a first service;
    configuring a second link with the second device, the second link being associated with a second service; and
    performing communication with the second device using one or more of the first link and the second link,
    wherein the first link is a link configured between a node #11 included in the first device and a node #21 included in the second device, and the second link is a link configured between a node #12 included in the first device and a node #22 included in the second device, and
    wherein when at least one traffic identifier (TID) is mapped to the first link, the first link is determined as enabled for transmission of data.

2. The operation method according to claim 1, wherein a traffic type of data transmitted/received according to the first service is indicated by a first traffic identifier (TID), and a traffic type of data transmitted/received according to the second service is indicated by a second TID.

3. The operation method according to claim 2, wherein the first TID is mapped to one or more links including the first link, and the second TID is mapped to one or more links including the second link.

4. The operation method according to claim 2, wherein a transmission priority of the first TID is set differently from a transmission priority of the second TID.

5. The operation method according to claim 2, wherein the performing communication with the second device comprises:
    transmitting a first frame to the second device on the first link; and
    transmitting a second frame to the second device on the second link.

6. The operation method according to claim 5, wherein a transmission starting time of the second frame is same as a transmission starting time of the first frame, and a transmission completion time of the second frame is same as a transmission completion time of the first frame.

7. The operation method according to claim 5, wherein a media access control (MAC) header of the first frame includes first destination address information, and a MAC header of the second frame includes second destination address information indicating an address different from the first destination address information.

8. An operation method of a first device in a wireless local area network (WLAN) supporting multi-link operations, the operation method comprising:
    configuring a first link with a second device, the first link being associated with a first service;
    configuring a second link with the second device, the second link being associated with a second service;
    receiving one or more frames using one or more of the first link and the second link; and
    transmitting response frame(s) for the received one or more frames by using one or more of the first link and the second link,
    wherein the first link is a link configured between a node #11 included in the first device and a node #21 included in the second device, and the second link is a link configured between a node #12 included in the first device and a node #22 included in the second device, and
    wherein when at least one traffic identifier (TID) is mapped to the first link or the second link, the first link or the second link is determined as enabled for transmission of data.

9. The operation method according to claim 8, wherein a traffic type of data transmitted/received according to the first service is indicated by a first traffic identifier (TID), a traffic type of data transmitted/received according to the second service is indicated by a second TID, the first TID is mapped to one or more links including the first link, and the second TID is mapped to one or more links including the second link.

10. The operation method according to claim 8, wherein the transmitting of the response frame(s) comprises:
    transmitting, to the second device, a first response frame that is a response frame to a first frame received on the first link; and
    transmitting, to the second device, a second response frame that is a response frame to a second frame received on the second link.

11. The operation method according to claim 10, wherein the first response frame is transmitted on a link indicated by the first frame, and the second response frame is transmitted on a link indicated by the second frame.

12. The operation method according to claim 10, wherein a transmission starting time of the second frame is same as a transmission starting time of the first frame, and a transmission completion time of the second frame is same as a transmission completion time of the first frame.

13. A first device in a wireless local area network (WLAN) supporting multi-link operations, the first device comprising:
    a processor;
    a memory electronically communicating with the processor; and
    one or more instructions stored in the memory,
    wherein when executed by the processor, the one or more instructions cause the first device to:
    configure a first link with a second device, the first link being associated with a first service;
    configure a second link with the second device, the second link being associated with a second service; and
    transmit one or more physical layer protocol data unit(s) (PPDU(s)) to the second device by using one or more of the first link and the second link, wherein the first link is a link configured between a node #11 included in the first device and a node #21 included in the second device, and the second link is a link configured between a node #12 included in the first device and a node #22 included in the second device, and wherein when at least one traffic identifier (TID) is mapped to the first link or the second link, the first link or the second link is determined as enabled for transmission of data.

14. The first device according to claim 13, wherein a traffic type of data transmitted/received according to the first service is indicated by a first traffic identifier (TID), a traffic type of data transmitted/received according to the second service is indicated by a second TID, the first TID is mapped to one or more links including the first link, and the second TID is mapped to one or more links including the second link.

15. The first device according to claim 13, wherein in the performing communication with the second device, the one or more instructions cause the first device to:

transmit a first frame to the second device on the first link; and transmit a second frame to the second device on the second link.

16. The first device according to claim 15, wherein a transmission starting time of the second frame is same as a transmission starting time of the first frame, and a transmission completion time of the second frame is same as a transmission completion time of the first frame.

17. The first device according to claim 15, wherein the one or more instructions cause the first device to:

transmit, to the second device, a first response frame that is a response frame to the first frame received on the first link; and transmit, to the second device, a second response frame that is a response frame to the second frame received on the second link.

18. The first device according to claim 17, wherein the first response frame is transmitted on a link indicated by the first frame, and the second response frame is transmitted on a link indicated by the second frame.

19. The first device according to claim 17, wherein a reception starting time of the second response frame is same as a reception starting time of the first response frame, and a reception completion time of the second response frame is same as a reception completion time of the first response frame.

* * * * *